Figure 1:
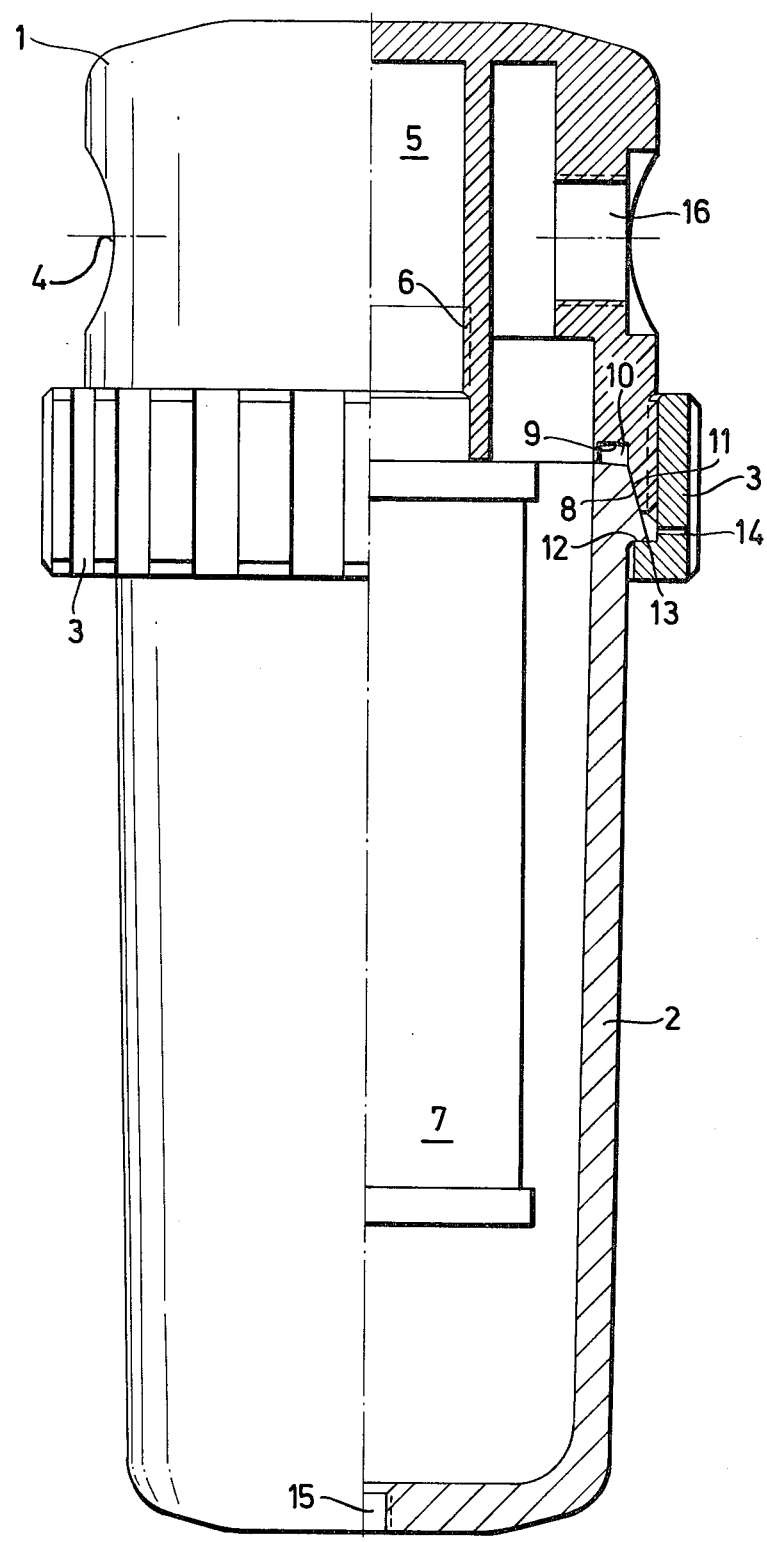

United States Patent [19]

Kronsbein

[11] 4,172,798
[45] Oct. 30, 1979

[54] FILTER HOUSING

[75] Inventor: Dirk G. Kronsbein, Düsseldorf, Fed. Rep. of Germany

[73] Assignee: Ultrafilter GmbH, Düsseldorf, Fed. Rep. of Germany

[21] Appl. No.: 878,599

[22] Filed: Feb. 16, 1978

[30] Foreign Application Priority Data

Feb. 28, 1977 [DE] Fed. Rep. of Germany ....... 7706093

[51] Int. Cl.² ............................................. B01D 27/08
[52] U.S. Cl. .................................... 210/446; 210/450
[58] Field of Search ............... 210/446, 448, 450, 449, 210/451, 232, 238; 55/498, 502; 29/163.5 F, 527.2, 527.3; 220/288, 303, 304, 319, 457–459

[56] References Cited

U.S. PATENT DOCUMENTS

| 2,418,247 | 4/1947 | Dalzell | 210/441 |
| 3,539,480 | 11/1970 | Groff et al. | 220/458 |
| 3,827,636 | 8/1974 | Parkison | 210/449 |
| 3,832,962 | 9/1974 | Rolles | 220/458 |

Primary Examiner—William A. Cuchlinski, Jr.
Assistant Examiner—Jon E. Hokanson
Attorney, Agent, or Firm—Toren, McGeady and Stanger

[57] ABSTRACT

A multi-part fluid filter housing having first and second parts and being arranged to contain a replaceable filter element includes complementary frusto-conical mating surfaces between the two parts. The two parts are held together by a screw threaded ring which is screwed onto the outer face of the first part and which includes an internal flange engaging an external flange on the second part. The second part is tapered to improve the flow characteristics of the housing and preferably includes a taper of between 1 and 2%.

8 Claims, 2 Drawing Figures

FILTER HOUSING

This invention relates to a multiple-part fluid filter housing having first and second parts, and an inlet and an outlet and being arranged to contain a replaceable filter element.

Filter housings of this type are known. However they require improvement in many respects, particularly with regard to their safety provisions. Furthermore, the range of efficiency of the known filter housings is limited, especially at temperatures above 100° C., and they are not perfectly designed from the point of view of flow and consequently they operate with considerable losses.

Therefore, this invention is based on the problem of providing a filter housing which is simple, robust and compact in construction, versatile in use and capable of being opened or closed rapidly to change the replaceable filter element. The filter housing should also have favourable flow characteristics and comply with safety requirements fully.

According to this invention a filter housing has a first part and a tapering second part, an inlet and an outlet, and is arranged, in use, to contain a replaceable filter element, the first and second parts having complementary frusto-conical mating surfaces and being connected together by a screw threaded ring which is screwed onto the outer face of the first part and which includes an internal flange engaging an external flange on the second part.

Preferably, the first part of the housing includes an axially compressible seal which is retained in a groove so that it does not drop out when the second part is removed. From the point of view of the flow characteristics of the housing it has been found to be particularly effective for the second part of the housing to have a taper of between 1 and 2%. The frusto-conical mating surfaces provide optimum sealing action between the two parts and preferably the frusto-conical mating surface on the second part merges into the external flange.

Preferably the bottom of the second part includes a centrally disposed aperture to receive a screw-in condensate drain. Interengaging formations may be provided on the two parts to prevent rotation between the two parts and provide location between the two parts.

As a means of monitoring that a fluid-tight connection has been made between the two parts, the screw threaded ring may include a number of bores around its periphery through which, for example during a test run when the filter housing is used to filter a gas, the gas emerges and makes a whistling or hissing noise if a gas-tight closure has not been made. This indication enables readjustment to be made at once.

Finally, in one example, the first part, the second part and the screw threaded ring are cast from light metal alloys, preferably aluminium alloys, and are coated with a synthetic plastics material.

The advantages of a filter housing in accordance with this invention include that the three main components, namely the one part, the second part and the screw threaded ring which connects the two parts may be made from lightweight corrosion-resistant aluminium alloys e.g. aluminium-silicon-magnesium alloys, and the housing is of simple, robust and compact construction, is versatile in use and can be opened and closed easily and rapidly. The two parts of the housing are connected rigidly to each other both when the housing is under pressure and when it is not in operation. Also, the filter housing has particularly favourable flow characteristics as turbulences within the housing are kept to a minimum and the housing corresponds entirely with conventional safety requirements. Further, the filter housing according to this invention has an increased effective life and it can be used at a temperature of up to 120° C. and at a throughput of up to 700 cu.Nm per hour.

Figure 2:
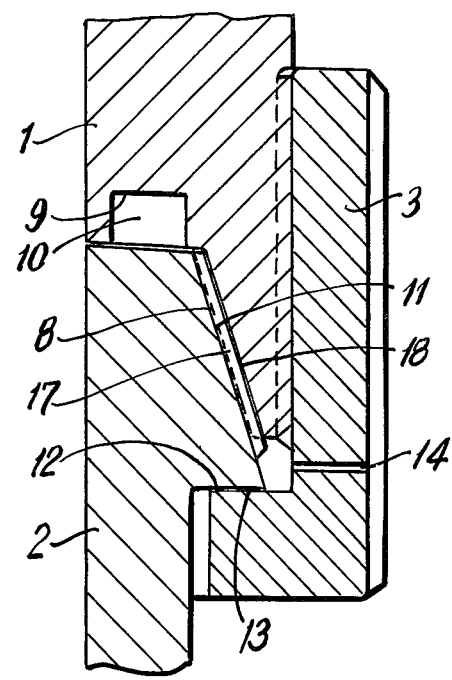

A particular example of a gas filter housing in accordance with this invention will now be described with reference to the accompanying drawings, wherein FIG. 1 is a partly sectioned side elevation of a filter in accordance with the invention; and FIG. 2 is a sectional view showing in greater detail part of the structure of FIG. 1.

The filter housing comprises a top part 1, a bottom part 2 and a screw threaded ring 3 which connects the top and bottom parts 1 and 2 together. The ring can be screwed and unscrewed without tools. At one side of the top part is an inlet aperture 4 for the medium which is to be filtered and the inlet 4 extends into a central cavity 5 inside the top part 1. The bottom of the central cavity 5 includes an internal screw thread 6 into which a replaceable filter element 7 is fitted, in use.

The outer wall of the top part 1 includes an external screw thread complementary to that on the screw threaded ring 3. The lower open end of the top part 1 includes a frustoconical seating 8 leading in to a groove 9 in which an axially compressible sealing ring 10 is held. The bottom part 2 also includes a frusto-conical seating 11 which mates with the seating 8. The interconnection of the parts 1 and 2 is facilitated by a recess 18 formed in the inclined inner surface or frusto-conical seating 8 of the top part 1 which is engaged by a projection 17 upstanding from the seating 11 of the bottom part 2 to enable the two parts to be located and to prevent them rotating with respect to one another as best seen in FIG. 2.

The top part 1 and the bottom part 2 are held together by the screw threaded ring 3 which is screwed onto the top part 1. The screw threaded ring 3 includes an internal flange 12 and this engages an external flange 13 on the bottom part 2. The frusto-conical seating 11 extends downwards towards and buttresses the flange 13.

If a gas-tight seal is not made between the top and bottom parts then the gas to be filtered produces an acoustic signal by passing between the frusto-conical surfaces 8 and 11 and then flowing out through bores 14 distributed around the periphery of the screw threaded ring 3.

The bottom of the bottom part 2 includes a central aperture 15 screw threaded to receive condensate drain, not shown. The bottom part 2 is tapered i.e. its internal face tapers downwardly from its junction with the top part. Preferably the degree of taper of this bottom part is 1%. The top part 1, the bottom part 2 and the screw threaded ring 3 are made from aluminium alloys, preferably aluminium-silicon-magnesium alloys. After cleaning and undergoing surface treatment, the parts 1, 2 and 3 are coated on both of their inside and outside faces with a synthetic plastics material, preferably with a polyester resin.

The gas filtered by the filter element 7 leaves the filter housing through an outlet orifice 16 in the side of the top part 1 opposite that of the inlet aperture 4.

I claim:

1. A filter housing for containing a replaceable filter element comprising a first part; a second part; inlet means for the medium to be filtered; outlet means for the filtered medium; first frusto-conical seating means formed on said first part; second frusto-conical seating means formed on said second part, said first frusto-conical seating means mating with said second frusto-conical seating means to join said first part to said second part; an external screw thread on said first part; an external flange on said second part; said second part tapering in the direction away from said external flange; connecting ring, said connecting ring including an internal screw thread and an internal flange; said internal screw thread on said connecting ring co-operating with said external screw thread on said first part to engage said connecting ring and said first part, and said internal flange on said connecting ring engaging said external flange on said second part; said connecting ring holding said first and said second parts together; said first and said second frusto-conical seating means including interengaging formations to provide location and prevent rotation between said first and said second part.

2. The filter housing of claim 1, wherein said part includes axially compressible sealing means to seal said joint between said first and said second parts.

3. The filter housing of claim 1, wherein said taper on said second part is within a range from 1% to 2%.

4. The filter housing of claim 1, wherein said second part further includes a centrally disposed aperture in its end remote from said external flange.

5. The filter housing of claim 1, wherein said first part, said second part and said connecting ring are all cast from light metal alloy and are all coated with a synthetic plastics material.

6. The filter housing of claim 5, wherein said light metal alloy is an aluminium-silicon-magnesium alloy and said synthetic plastics material is a polyester resin.

7. A filter housing for containing a replaceable filter element comprising a first part; a second part; inlet means for the medium to be filtered; outlet means for the filtered medium; first frusto-conical seating means formed on said first part; second frusto-conical seating means formed on said second part, said first frusto-conical seating means mating with said second frusto-conical seating means to join said first part to said second part; an external screw thread on said first part; an external flange on said second part; said second part tapering in the direction away from said external flange; a connecting ring, said connecting ring including an internal screw thread and an internal flange; said internal screw thread on said connecting ring co-operating with said external screw thread on said first part to engage said connecting ring and said first part, and said internal flange on said connecting ring engaging said external flange on said second part; said connecting ring holding said first and said second parts together; said connecting ring including a plurality of bores arranged around its periphery.

8. A filter housing for containing a replaceable filter element comprising a first part; a second part; inlet means for the medium to be filtered; outlet means for the filtered medium; first frusto-conical seating means formed on said first part; second frusto-conical seating means formed on said second part, said first frusto-conical seating means mating with said second frusto-conical seating means to join said first part to said second part; an external screw thread on said first part; an external flange on said second part; said second part tapering in the direction away from said external flange; a connecting ring, said connecting ring including an internal screw thread and an internal flange; said internal screw thread on said connecting ring co-operating with said external screw thread on said first part to engage said connecting ring and said first part, and said internal flange on said connecting ring engaging said external flange on said second part; whereby said connecting ring holds said first and said second parts together; said first part including axially compressible sealing means to seal said joint between said first and said second parts; said taper on said second part is within a range from 1% to 2%; said second part further includes a centrally disposed aperture in its end remote from said external flange; said connecting ring includes a plurality of bores arranged around its periphery; and said first part, said second part, and said connecting ring are all cast from an aluminium-silicon-magnesium alloy and are all coated with a synthetic plastics material.

* * * * *